April 20, 1926.
E. G. DANN
1,581,394
COMPOSITE ELEMENT AND METHOD OF MAKING THE SAME
Filed Jan. 11, 1918
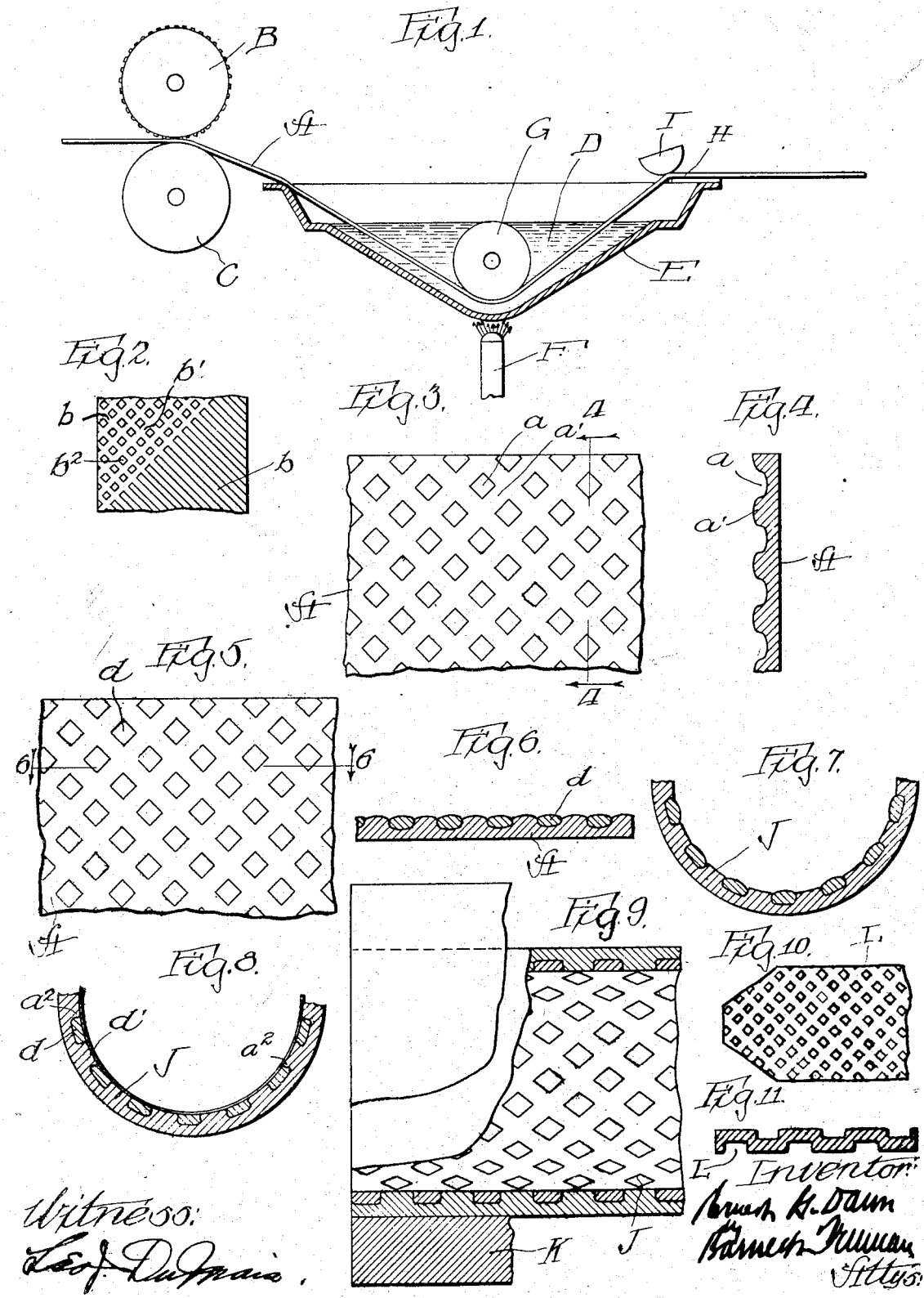

Patented Apr. 20, 1926.

1,581,394

UNITED STATES PATENT OFFICE.

ERNEST G. DANN, OF CLEVELAND, OHIO, ASSIGNOR TO THE DANN PRODUCTS COMPANY, A CORPORATION OF OHIO.

COMPOSITE ELEMENT AND METHOD OF MAKING THE SAME.

Application filed January 11, 1918. Serial No. 211,324.

*To all whom it may concern:*

Be it known that I, ERNEST G. DANN, a citizen of the United States, residing at Cleveland, in the county of Cuyahoga and State of Ohio, have invented certain new and useful Improvements in Composite Elements and Methods of Making the Same, of which the following is a specification.

My invention relates to the treatment of articles or bodies more especially of metal so as to incorporate in the superficial portions of the same another substance which naturally has little tendency to adhere to such bodies; the union between the body and said treating substance being, in accordance with my invention, made permanent, so far as ordinary purposes are concerned, and of such a nature that the surface treated has the character of the treating substance.

The primary objects of the invention are to provide, in the first place, a composite body of this type, and, in the second place, a preferred method of producing the same.

The operation with which the invention is concerned may be made use of in the production of a bearing element of any desired type; in which case the body treated may have incorporated in a superficial portion or portions thereof a substance such as graphite so that a bearing surface or surfaces are provided which will be permanently lubricated. It is one of the specific objects of the invention to provide a bearing element of this character, and in this connection a further object is to provide a bearing element in which the lubricating substance is united with the treated body so that the bearing surface is capable of resisting thrusts or pressures (the thrust of the shaft in a shaft bearing, for example) to substantially the same extent at all places thereon; the bearing element being, in this regard, as well as in the permanency of the union of the lubricant with the treated body, superior to the oilless bearings, so-called, which have been heretofore used to some extent.

A further object is to produce, economically and conveniently, a cylindrical bearing or bushing comprising an outer shell of relatively cheap metal and a thin inner sleeve of the more expensive bearing metal; and, further, preferably to so treat the inner sleeve that it will be permanently lubricated.

Instead of treating the metal body to decrease the frictional resistance of its surface when in moving contact with another element, as in the production of a bearing, the metal body may be similarly treated, in accordance with my invention, by incorporating an abrasive substance such as asbestos flour, carborundum or diamond dust in superficial portions thereof in the manufacture, for example, of brake bands, laps for smoothing down hardened steel tools, or other similar devices; and, on the other hand, metal articles, such as boiler plates, may be treated with graphite or other similar substance or composition, not for the purpose of lubrication, literally speaking, but with the object of preventing the adherence of scale, or such like. The invention, in its broader aspects, is, therefore, not limited to the production of any one species of articles. However, for the purpose of illustrating the invention in a preferred form in the making of which all the advantageous features of my invention are employed, I shall describe the manufacture of a bearing element of the cylindrical type. The invention has certain special advantages and features of novelty in this connection.

Fig. 1 illustrates, diagrammatically, an apparatus for carrying out certain of the steps in the manufacture of a bearing element of the kind contemplated by my invention.

Fig. 2 is a view, somewhat magnified, of a part of the surface of a roller employed for indenting the metal body, showing the cutting of the roll in an incomplete state.

Fig. 3 is a fragmentary view, in plan and on a larger scale, of the metal element before treated with the lubricant.

Fig. 4 is a section on line 4—4 of Fig. 3.

Fig. 5 is a magnified view of the metal body loaded with the lubricant.

Fig. 6 is a section on line 6—6 of Fig. 5.

Fig. 7 is a fragmentary cross sectional view showing the bearing element bent to cylindrical shape.

Fig. 8 is a similar view showing the element after being subjected to pressure.

Fig. 9 is a fragmentary view of the bearing element enclosed in an integral cylindrical shell of steel, or the like.

Fig. 10 shows a leaf spring insert strip made in accordance with the invention, and Fig. 11 is a sectional view of this strip on a magnified scale.

Like characters of reference designate like parts in the several figures of the drawings.

In accordance with my present invention, the surface or surfaces of the metal article are formed with a plurality of minute recesses or cavities, which are preferably non-communicating and are separated by a minimum amount of metal so that the cavities are brought together substantially as closely as possible consistent with providing each cavity with a stable and substantial retaining wall. These cavities are preferably formed by compressing the metal rather than by cutting it away or displacing it. Thus, while the metal is thinned by the formation of the cavities, its strength at these points is not substantially diminished as the metal below the cavities is made more dense than the normal.

The operation of thus indenting the metal to form cavities may be accomplished in any suitable manner. In Fig. 1 I have shown the body of metal as consisting of a relatively thin strip A of bronze, copper or other suitable bearing material, and the indentations as being formed by passing the strip through rolls B and C. If the material is to be indented only on one side the roll C, for example, is smooth while the roll B is formed with a plurality of intersecting channels $b$, $b'$ (Fig. 2). Between the channels are projections $b^2$ which operate to form on the contacting surface of the strip A, a plurality of indentations $a$ (Figs. 3 and 4). These indentations or cavities do not communicate with each other, each being defined by a circumferential rib of material $a'$. The cavities $a$ are arranged as close together as is possible without making the ribs too light and weak. The intersecting channels $b$, $b'$ are preferably spirals so that the cavities on the bearing element will have a diagonal arrangement in the bearing surface. When so disposed any movement over the bearing surface in the direction lengthwise or transversely of the strip (or correspondingly in the finished article) will insure that each point on the moving body will traverse at short intervals a plurality of the bodies of lubricant located in said cavities. The same result could be obtained but less conveniently by having the grooves run longitudinally and transversely of the roll and cutting the strip bias in making up the bearing.

After the metal strip A has been indented in the manner just described, the cavities are filled with lubricating or other substance, preferably by running it through a bath of the material. In the manufacture of a bearing this substance may consist of graphite and a suitable binder, compositions of this sort being known in the art and being commonly used for lubricating purposes, of one sort or another. I prefer to employ a mixture of graphite with a coal tar product known to the trade as "mineral black" which becomes fluid when heated. The graphite is mixed with the binder while the latter is in fluid condition, the mixture forming a paste which hardens on cooling. I have shown the lubricant D as contained in a tank E and kept in hot, fluent condition by a burner F. The strip passes under a roller G in the tank E and over a scraper H at the further edge of the tank. This scraper removes any lubricant that may adhere to the under side of the metal strip. Above the scraper is preferably arranged a presser I which bears upon the recessed side of the strip compressing the lubricant into the recesses to a certain extent.

If the treating substance employed is a graphite composition, such as that mentioned, for example, the metal body when loaded with the lubricating compound is baked in a bed of graphite. The result of this treatment is to eliminate by volatilization a part of the binder, at least from the superficial portions of the bodies of compound, and incorporate into such bodies additional graphite, whereby the lubricating quality of such bodies is improved.

However, if the metal strip, or other article, is to be cut up into pieces or bent, or otherwise worked into some particular configuration, it is desirable to perform these forming or bending operations while the lubricant is relatively plastic before it has been subjected to heat in contact with the graphite, as described.

Thus in making the cylindrical bearing element shown fragmentarily in Fig. 7, a piece J is cut from the metal strip A after the latter has been loaded with the lubricant. This piece is then bent into cylindrical form, (as shown in Fig. 7) or to substantially cylindrical form, over a mandrel, for example, and thereupon baked in the graphite bed. The next step is to subject the inner surface of the cylinder to pressure which compresses the lubricating bodies to give them preferably a maximum density. The bearing may be completed by enclosing the bearing element in a shell K having a cylindrical bore. The device so constructed may be manufactured economically inasmuch as the shell, which gives strength to the bearing, may be of relatively cheap metal, while the bearing element itself, which is preferably composed of more expensive metal, such as bronze or copper, is quite thin.

In the finished article (Figs. 8 and 9) the superficial portion of the bearing element treated as above described, consist of minute bodies $d$ of the lubricant interspaced by relatively thin metal retaining walls which latter maintain the lubricant bodies from displacement. The lubricant will be permanently united to the metal, to all intents and purposes. As each body of the lubricant is in a pocket, as it were, so that it cannot be displaced by a thrust against the treated surface, and as the lubricant, by the heating and compressing operations, has been reduced to maximum density, the bearing surface provided by my invention has substantially the same capacity at all points thereon for resisting thrusts or pressures. So far as it wears it will wear evenly. The recesses are preferably so minute and so close together that, in effect, the entire surface of the metal is covered with a lubricant. The ridges or walls intervening between the recesses are, in fact, covered over with a film $d'$ of the lubricant in most cases. Moreover, when the cavities are made by depression of the metal in contradistinction to a cutting out or a displacement thereof, the thinning of the metal at the points where the cavities are formed does not materially weaken the metal at these points. When a cylindrical bearing is made the bending of the strip into the form of a cylinder tends to partially close the openings into the cavities giving a slight overhang of the metal which may be increased to a certain extent by the pressing operation, this overhang being indicated at $a^2$ (Fig. 8).

It has been stated that the lubricant is to all intents and purposes permanently united to the metal, but by such statement I do not mean any integral or mechanical union between these materials, which would of course be impossible to obtain with such dissimilar materials. The lubricant is securely bound to the metal, however, in two ways. It is bound physically by reason of the adhesive character of the binder incorporated with the lubricant, and also mechanically by means of the overhanging edges of the walls of the lubricant-receiving cavities in the metal. It is in this way that the lubricant is bound or retained in the cavities in the metal, and for all practical purposes the lubricating material is locked into the cavities in the metal. Obviously a metal strip, such as the spring insert strip L, might be formed with cavities on both surfaces by providing in place of roll C a roll cut like roll B.

While the invention has special reference to the treatment of metal, substantially the same method might be made for incorporating a substance such, for instance, as graphite, in the superficial portion of non-metallic material such as fibre board, or other composition. The cavities in the body, when the latter is of metal, might be made by suitable treatment of the body with an acid but this specific process of manufacture is not claimed herein, being the subject matter of a co-pending application Serial No. 211,094, filed January 9, 1918.

I claim:

1. A metal element having a surface formed with a plurality of minute cavities in proximity to each other and bodies of a lubricating substance filling said cavities and mechanically held therein by the walls of said cavities.

2. A metal element having a surface formed with a plurality of minute cavities in proixmity to each other and bodies of a solid lubricant filling said cavities and compressed to an extent rendering them equally resistant to pressure with the surrounding metal.

3. A metal element having a surface formed with a plurality of minute cavities in proximity to each other and bodies of a solid lubricant filling said cavities and mechanically confined therein by the adjacent walls, said bodies of lubricant being compressed to an extent rendering them equally resistant to pressure with the surrounding metal.

4. A metal element formed with a plurality of minute cavities having a minimum of metal separating them and bodies of lubricant filling such cavities and mechanically retained by the metal walls of such cavities.

5. A metal element formed with a plurality of minute cavities having a minimum of metal separating them and bodies of lubricant filling such cavities and physically adhering to the metal walls of such cavities.

6. A metal element formed with a plurality of minute cavities having a minimum of metal separating them and bodies of lubricant filling such cavities and physically adhering to the metal walls of such cavities, said bodies being also mechanically retained by the metal walls of such cavities.

7. A metal element formed with a plurality of minute separate cavities and having a minimum of metal separating them and bodies of graphite filling said cavities and compressed therein so that the load-carrying capacity of the surface so treated is substantially unform throughout.

8. A composite article comprising a body having formed in the surface thereof a plurality of minute cavities in close proximity to each other and a surfacing substance filling said cavities and mechanically bound in said body so that the surface so treated has the character of the surfacing substance.

9. A composite article comprising a body having formed in the surface thereof a plurality of minute cavities in close proximity to each other and a lubricating substance filling said cavities and mechanically bound in said body so as to give the surface treated a lubricated character.

10. A composite article comprising a body formed with a plurality of minute non-communicating cavities in one surface thereof, and a lubricating substance compressed in said cavities, the cavities being disposed in close proximity to each other whereby the entire surface treated has a lubricated character.

11. A body of homogeneous, non-porous character, one surface of which is formed with a plurality of minute cavities in proximity to each other, and graphite compressed in said cavities so as to be firmly held in said body.

12. Method of manufacturing a composite article of the character described which consists in subjecting a metal element to pressure to form cavities in the face of the same, filling said cavities with a surfacing substance and subjecting the face of the metal so treated to pressure.

13. A method of manufacturing a composite artcile of the character described which consists in forming a plurality of adjacently disposed cavities in the face of a metal element, filling said cavities with a surfacing substance, first shaping the article to the configuration required, and thereafter subjecting the face treated with the surfacing substance to pressure.

14. A method of manufacturing a composite article of the character described which consists in subjecting a metal element to pressure to form cavities in the face of the same, filling said cavities with a graphite composition and subjecting the face of the metal so treated to pressure.

15. A method of manufacturing a composite article of the character described which consists in forming a plurality of adjacently disposed cavities in the face of a metal element, filling said cavities with a graphite composition, first shaping the article to the configuration required, and thereafter subjecting the face treated with the graphite composition to pressure.

16. A method of manufacturing a composite article of the character described, which consists in forming a plurality of adjacent cavities in the face of a metal element, filling said cavities with a substance consisting of graphite and a binder, heating the artcle, and subjecting the face so treated to pressure.

17. A method of manufacturing a composite article of the character described which consists in forming a plurality of adjacent cavities in the face of a metal element, filling said cavities with a substance consisting of graphite and a binder, and thereafter subjecting the article to heat with the face treated as described in contact with the body of graphite.

18. A method of making a composite article of the character described, which consists in forming minute cavities in the face of a metal element with a minimum of metal separating them, filling said cavities with a composition of graphite and binder heated to make the same fluent, and baking the article in a bed of graphite.

19. A method of manufacturing a composite article of the character described, which consists in subjecting a body to pressure to form a plurality of adjacent cavities in the face of the same, filling said cavities with a surfacing substance, and subjecting the face of the metal so treated to pressure.

20. A method of manufacturing a composite article of the character described, which consists in forming minute cavities in the face of the body with a minimum of material of said body between said cavities, filling the cavities with a composition of graphite and a binder heated to make the same fluent, and baking the article in a bed of graphite.

21. A method of making a bearing which consists in permanently incorporating bodies of a lubricating substance into a superficial portion of a thin piece of bearing metal into cylindrical form, compressing the bodies of lubricant and fitting the piece of metal into a retaining shell of another metal.

22. A method of making a bearing which consists in forming indentations in the metal element, filling said indentations with a plastic composition containing mineral black and graphite, forming the metal element into the desired shape, baking the same in a bed of graphite, and subjecting the surface of the metal so treated to pressure.

23. A bearing formed from a strip of metal, having one surface first scarified to provide a series of holding pockets, a lubricant pressed into said scarifications, and the filled scarified sheet being turned to the form of a tube to provide a complete bearing.

24. A bearing consisting of a shell formed from sheet metal, scarifications provided in one surface thereof, providing lubricating pockets for the completed bearing, when it is formed up into a tubular bearing, the scarified portions alternating with the unbroken surfaces of the metal to provide series of holding pockets for the lubricant, and a lubricant filling the scarifications.

25. The method of producing self-lubricating bearings which consists in feeding a strip of metal to scarifying dies, subsequently impressing in said scarified portions of the metal a lubricating compound and scraping the excess of lubricant from the metal, trimming said metal to length, and rolling the same into finished tubular bearings.

26. A bearing element comprising a seamless cylindrical metal shell and a split bearing member fixed within said shell and having its outer wall in forced engagement with the inner wall of said shell, and said bearing member being formed of sheet metal and having certain portions of its inner bearing surface subjected to a deforming rolling pressure.

27. A bearing element comprising a seamless cylindrical metal shell and a plit bearing member fixed within said shell and having its outer wall in forced engagement with the inner wall of said shell, and said bearing member being formed of rolled sheet metal provided with a multiplicity of minute recesses.

28. A bearing element comprising a seamless cylindrical metal shell and a split bearing member fixed within said shell and having its outer wall in forced engagement with the inner wall of said shell, and said bearing member being formed of rolled sheet metal provided with a multiplicity of minute recesses containing a lubricating composition.

29. A method of producing bearings which consists in pressing a plurality of recesses in one surface of a strip of rolled sheet metal, thereby simultaneously hardening the adjacent metal, and then forming said strip into a cylindrical bearing.

30. A bearing consisting of a shell formed from sheet metal, scarifications provided in one surface thereof, providing lubricating pockets for the completed bearing, when it is formed into a tubular bearing, the scarified portions alternating with the unbroken surfaces of the metal to provide a series of holding pockets for the lubricant.

ERNEST G. DANN.